Dec. 4, 1928.  
F. H. THOMAS  
1,693,968  
SYSTEM FOR EXCITATION OF SYNCHRONOUS TYPE ELECTRIC MACHINES  
Filed July 26, 1924
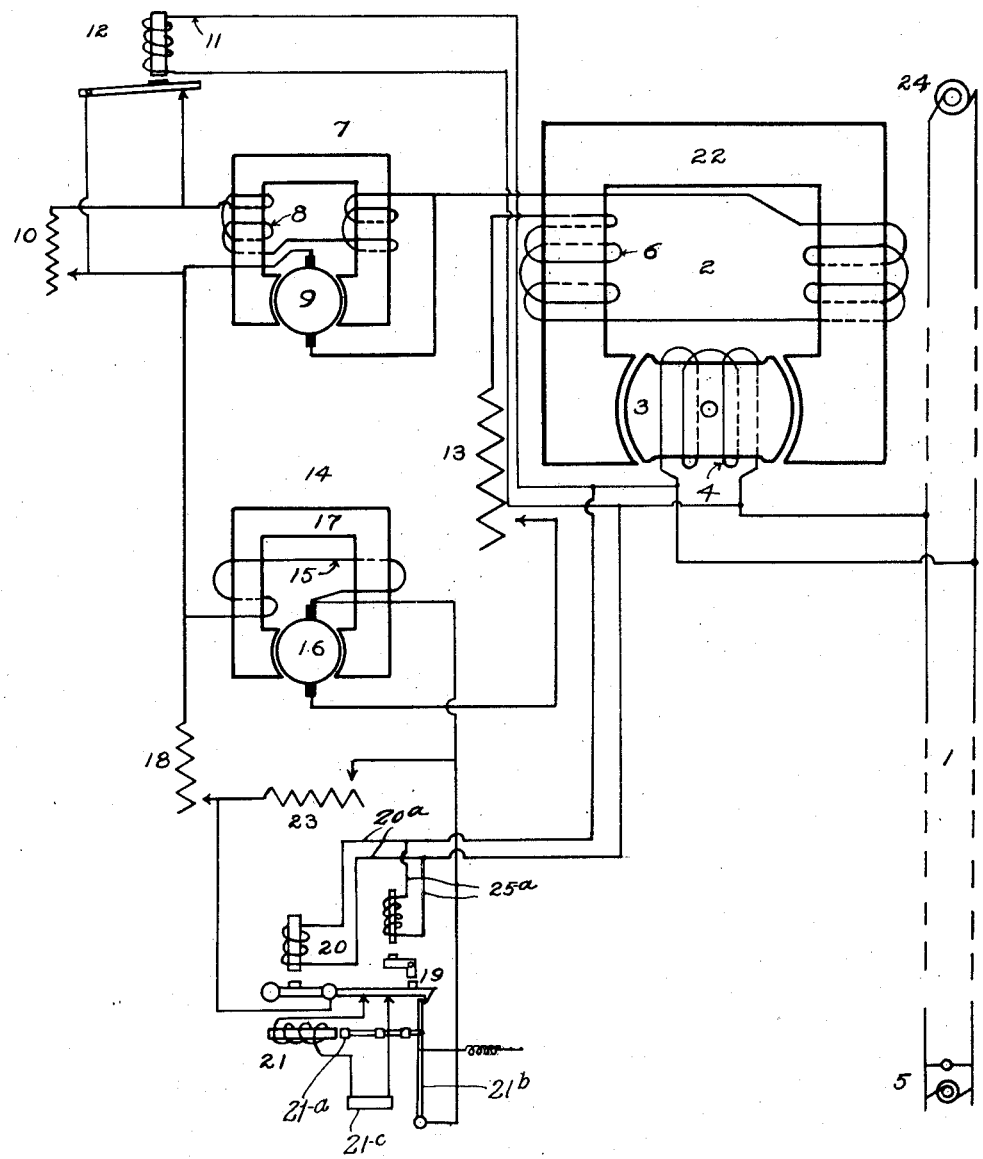
WITNESSES:
INVENTOR Patented Dec. 4, 1928.

1,693,968

UNITED STATES PATENT OFFICE.

PERCY H. THOMAS, OF UPPER MONTCLAIR, NEW JERSEY.

SYSTEM FOR EXCITATION OF SYNCHRONOUS-TYPE ELECTRIC MACHINES.

Application filed July 26, 1924. Serial No 728,449.

The present invention relates to systems of excitation adapted to the control of synchronous type electric generators, motors, rotary converters and similar apparatus and has more particularly for its object the stimulating or supporting of such machines at times of sudden change in conditions, such, for example, as electric disturbances on connected systems of transmission and distribution. The invention will be well understood from the following specification and claims.

It is well understood when a long transmission line is energized for the purpose of being able to transmit power in one or both directions, that when the voltage at the ends of the line, or at points on the line where synchronous apparatus is connected, is fixed and the amount and direction of the load is fixed, there can be but one power factor for the current at any one of the points at which the voltage is fixed. In making the above statement I am leaving out of account the fact that the theoretical equations show a second possible value of power factor for most cases corresponding to a second point at which the vertical ordinate in a circle diagram, in which ordinates represent kva. and abscissæ kw., cuts the circle, this being a point not used and not considered in the present discussion.

It will be found upon examination that when a definite amount of power is being transmitted over such a line and a demand for more power occurs or when for any reason the voltage at any point is dropped, that a change, usually a lowering, of the power factor must occur in the transmission line, by which I mean the equivalent of an increase or a decrease of the field bucking component of the current passing into the line. Field bucking component of the current or "field bucking current" is current which tends to oppose the magnetizing effect of the field ampere turns in the synchronous machine when flowing in the armature. Without such field bucking current the transmission line assumed would not be able, on a drop in voltage, to carry the assumed load.

As a matter of fact, in the designs usually put out for large generators and synchronous condensers, however, this field bucking current greatly reduces the field strength of the machine within a very short time after the new condition is set up in such a way as to greatly limit the usefulness of the machine supplying field bucking current and thus in giving support to the transmission line as described.

The present purpose is to describe a method of overcoming this limitation and enabling a much greater effectiveness to be gotten from a given machine. For this purpose I introduce in series with the field winding and the exciter on the main generator or synchronous condenser, a series wound generator or equivalent which is constantly driven at a definite speed by any appropriate source of power. The main field current then passes both through the armature of this series machine and through its field causing a generation of electromotive force, more or less proportional to the field current, within a reasonable range.

During normal operation I would provide a shunt, containing a quick-acting circuit breaker, around the field winding so that the main field current while passing through the armature would be shunted around the field, which would thus cause little or no magnetic flux; the result would be that a very small amount of voltage would be generated by the series machine and very little energy delivered.

When now anything happens which calls for an increase from the main generator of field bucking current, which may be taken as either a drop in the terminal voltage of the main generator or an increase in current flowing in any particular circuit that may be selected as a governing circuit, the shunt to the field of the series machine will be opened as rapidly as possible by the quick-acting circuit breaker, forcing the main current through the field of the series machine. The net result will be to add suddenly a considerable voltage in the main field circuit the amount of which added voltage may be controlled by the design of the series machine and other characteristics within a wide range. Since it takes a certain definite but small time for the demagnetizing action of the machine armature current to actually accomplish a reduction in the flux in the machine field core, a certain time is available for corrective action. The result of this increase of voltage will be first to encourage and support an increase of current flowing in the main field sufficient to neutralize the effect of the added current flowing in the main machine armature, which armature current tends to oppose the magnetizing effect of the current in the main machine field. Since this action does not presume any change in the main field flux there is no reason why a new adjustment should not take place with very great rapidity provided the design of the machine is made, by wellknown methods, to favor this quick change of current.

A second useful purpose that may be served by this additional voltage from the series machine in the main field circuit, is the producing of a tendency for the increasing of the flux in the main field as rapidly as this may be permitted by the constants of the circuit. This increase in flux causes a counter electromotive force in the armature circuit of the synchronous machine which counter electromotive force is like the electromotive force in the secondary winding of a transformer and will cause additional current to flow in the armature circuit, which is the useful result sought. The first effect of the added voltage in the field circuit, i. e., normally opposing of field demagnetization tendency of the increased armature current, is very helpful and may be made to serve for practical purposes. The second action will in favorable cases permit a very large increase in the effectiveness of a given machine but will of necessity be somewhat slower in action than the first because a certain change in the flux of the main field is involved.

If the main field voltage is laid out at 120 volts or some other suitable relatively low voltage it will be feasible to add a relatively very high voltage from the series machine in series with the main field winding without endangering insulation and thus obtain very great advantage in operation. Since the main field of the series machine will carry current only for short periods of time, considerable economy in construction could be obtained by using small wire therein.

After the occurrence of such an emergency as I have just described and the restoration of normal conditions in the line, the field of the series machine should be short circuited allowing the normal exciter to take up the control of the system voltage This should be done by automatic closing of the shunt to the series field, as by a relay, when the voltage becomes normal or the restoration may be gradual by short circuiting of the series field through a resistance, either fixed in value or varied automatically, if desired, as may be most suitable for any particular condition, the object being to see that no disturbance of the conditions in the system be caused by the sudden withdrawal of the supporting voltage generated by the series machine. If this series machine voltage be withdrawn gradually its place will be taken as far as may be required by the normal exciter system under the control of the normal voltage regulator.

It may be pointed out that there is little or no danger of damage to the insulation of the field circuit or the exciter system by the series machine because the maximum voltage that can be introduced by this machine into the circuit is a controllable quantity and not likely to vary greatly from that appropriate to the design of the machine. Advantage may be taken of saturation in the field core for further protection.

I have shown one embodiment of my invention in the figure, in which 1 is a long transmission line, which has its voltage supplied by a synchronous machine 2, which may be a generator or a synchronous condenser or other synchronous type machine. The core of the armature of the machine 2 is shown diagramatically at 3 and its winding at 4. 24 is a distant generator feeding into the transmission line 1. 22 represents the field core of the machine 2 and 6 the field winding. This machine will usually be of the rotating field type when "standard" apparatus is used but this is not at all necessary. 5 represents receiving devices which may or may not be inductive or contain rotating parts.

The "exciter" for the machine 2 is shown at 7, 8 being the shunt field winding and 9 the armature. I have shown an automatic voltage regulator 12, which acts on the system by means of a vibrating contact which acts to shunt the series resistance 10 in series with the shunt winding of the exciter 7. This is a well known apparatus and needs no description here.

In series with the exciter and the field winding 6 of the machine 2 I insert the series generator 14, which I call a wattless current "inducer." The series field winding of this inducer 14, is shunted through a circuit breaker 19 and through a resistance 18. This resistance 18 is made adjustable and may have any desired value or it may be omitted. This breaker 19, which is normally held closed by the voltage on the generator 2, through the solenoid 20 and the leads 20ª, is preferably given an automatic closing means, as for example, the solenoid 21. An adjustable resistance 13 may be included in the field circuit of machine 2. A latch and solenoid 25 are placed to prevent the opening of the circuit breaker 19 in case there is a short circuit on the circuit of the generator 2, this solenoid 25 being energized from the mains of the generator 2 through the leads 25ª, the solenoid dropping the latch into the position shown in a drop in line voltage predetermined to correspond to such short circuit.

The operation of the system is as follows. When conditions are normal on the system, the voltage of the machine 2 will be kept constant by the action of the regulator 12, through the action of the vibrating shunt to the resistance 10. The circuit 11 is suitably controlled by the voltage of the machine 2 or by any other suitable quantity the former alternative being shown in the drawing. The circuit breaker 19 will be closed and no current will flow through the field winding 15 of the inducer 14 and no material voltage will be generated by the armature 16 of the inducer 14, which, however, must be kept running, as by being placed on the same shaft as the exciter 7.

Should a sudden increase of load occur on the transmission line 1, or should a distant short circuit cause a sudden drop of potential in the line, there will be a sudden flow of wattless power from the machine 2 to the line. At the first instant the strength of this wattless power will be largely determined by the true impedance or reactance of the machine 2. Once this flow of wattless current is established, however, it excites a demagnetizing action of the field flux in the core 22 of the machine 2 tending to reduce this flux and reduce the amount of the wattless power by reducing the voltage of the machine 2 as explained above. The prevention of any such reduction of wattless power is one of the results secured by the present invention. The action is as follows. When the voltage of the machine 2 drops, the winding 20 is de-energized and the circuit breaker 19 is released, opening the shunt to the field winding 15 of the inducer 14. This throws the current in the field circuit of the machine 2 through the field winding 15 and excites the field flux of inducer 14 which immediately generates an additional voltage in this circuit.

It is a well known fact that when such an increase of wattless current as here assumed flows in the winding 4 of a synchronous machine, that there is a momentary increase in the field current of the machine. This is due to the transformer action between the armature winding 4 of the machine and the field winding 6, through the field core 22, which acts like the core of any transformer during the continuance of the condition of changing current, i. e., during the transient period. To put it another way, the increasing demagnetizing current in the winding 4 causes a progressive decrease in magnetism in the core 22, which by the well known law of inductance produces a voltage in every winding on this core tending to prevent the change in the flux. This causes the increased field current referred to above.

Returning now to the "inducer," it is clear that the opening of the breaker 19, in response to the drop in the generator voltage, causing the building up of the inducer field, will insert an additional voltage in the field circuit containing the exciter 7 and the field winding 6 which should be connected in the same direction as the impulse of field current due to the increasing wattless current, thus tending to cause an increase in field current, for the purpose of counter balancing the demagnetizing effect of the wattless current in the winding 4.

While there will be a slight delay to the establishment of this additional voltage while the magnetism is being built up in the inducer field, this will be very brief with proper design of the machines, providing a much more powerful support for the machine 2 immediately after. The fact that the series field winding has a very few turns in comparison with the shunt winding of the exciter 7, gives a very great advantage in quickness of action to the series machine, over the shunt. Furthermore, the fact that the flux of the core 22 of the machine 2 will develop a momentary electromotive force to force the field current through the series field rapidly will also give a very great advantage in speed in the series machine over the shunt. The protection of the system from the development of too great a voltage, endangering insulation is covered below.

To the degree that is serves to balance demagnetizing effect of the added wattless current in the armature of machine 2, the increased current set up in the circuit of the field winding 6 by the voltage generated by the inducer prevents the reduction of wattless power ordinarily caused by such wattless current. To any extent that the increased voltage in the winding 6 exceeds the amount necessary to neutralize the added wattless current it produces another beneficial effect which is one of the objects of the present invention. This action is a sort of transformer action, occurring as follows: When the increased current in the winding 6 is more than sufficient to neutralize the demagnetizing action of the wattless armature current, it tends to increase the flux in the field core 22. But this is a large flux and will change slowly, there being always developed as a result of the applied electromotive force a counter electromotive force developed by the rising current in the field 6 which tends to prevent the rise in the field current. The counter electromotive force, however, appears also in the armature winding 4, where it tends to cause a flow of current into the transmission line. This last additional current is the desired supporting current for the line 1, which has suffered the increase in load or drop in voltage.

This last additional flow of current in the armature of machine 2 will be substantially wattless since at the time any phase of the winding 4 is in closest inductive relation to the field as a matter of physical position of the rotating armature, the voltage in that phase will be near the zero point. The amount of this last additional wattless current will be larger than might be expected, because it has two paths to take in the line circuit, one through the generator 24 and one through the load 5 and because the flow of this wattless current involves very small losses and no delivery of power properly speaking, the action of the whole group of line currents is somewhat complicated and need not be discussed here. The losses caused by this additional current will be small because the current is wattless current and out of phase with the line current which will usually be near unity power factor. An out of phase component of 50% would only cause about 10% increase of line current starting with unity power factor.

It can be seen from the above that my invention offers a very effective method of securing an important improvement in the operation of a system including a long transmission line. It may be used to advantage also in other places where a large flow of wattless current is required in response to a drop in potential. The same flow of wattless current may be obtained in connection with any other desired governing quantity, it being necessary merely to cause the desired quantity to open the breaker 19 which will produce the desired effect.

In further explanation I will state that it is not necessary to use a circuit breaker at 19, for any device or method of forcing the field current through the series field of the inducer will suffice. It is desirable though not necessary to limit or exclude short circuited grids or windings on the field core of the inducer, as these will tend to make the action more sluggish.

When the circuit breaker 19 has opened and the generation of voltage has been established in the inducer, the transient conditions still exist and changes start in immediately. The wattless current in the winding 4 due to the transformer action is supported only by the increase in the flux in the field core 22. That is, this flux must be steadily increasing. But as it increases the voltage of the machine 2 increases which tends to increase the armature wattless power while at the same time the unsatisfied voltage in the field circuit becomes less and the transformer action becomes less. These actions which are both in the same direction progress until the transformer action ceases and a steady condition is reached with a high field flux in the core 22 and a higher voltage on the armature terminals. This higher voltage on the terminals will cause a greater flow of power current as well as wattless current but the added power must be supplied by the prime mover and not by the energy in the field circuit.

Meanwhile, the voltage regulator 12 operating on the exciter 7 will start to operate as soon as the voltage falls, short circuiting the resistance 10. However, the field of the exciter will build up relatively very slowly as the reactance of the field winding 8 is very great. Finally, however, the voltage of the exciter will be increased and this will assist the inducer to support the armature wattless current. Under these conditions the terminal voltage of the machine 2 will reach or exceed normal and there will be need of no further support. Ordinarily it will be desirable to restore normal voltage and normal conditions without greatly exceeding normal voltage. I, therefore, provide means such as the solenoid 21 or its equivalent to close the shunt on the field of the inducer 14 when the terminal voltage reaches any desired predetermined value. This can be accomplished as shown by the same device 20 which will pick up its armature at the proper voltage and energize the solenoid 21. I have shown at 21$^a$ the armature of the magnet 21 and link connecting it with the circuit breaker arm 21$^b$. 21$^c$ is the source supplying energy to operate the magnet 21.

The closing of this breaker will withdraw a certain amount of support from the field circuit which will tend to cause a weakening of the wattless current, but this weakening may be controlled by proper design so as to be unimportant.

In the first place since the series field of the inducer has a short circuit through which to discharge, its magnetism will fall slowly due to the induced current in the shunt giving the exciter 7 time to build up to take its place. This rate of dying away can be controlled by the choosing of the resistance of the field circuit or by the use of the external resistance 18. Furthermore, the field flux in the core 22 must build up to the new value before the terminal voltage can build up and even after the inducer ceases action this field will be relatively stable and assist the exciter to assume the normal condition. It will be helpful from this point of view further, to set the restoring device 21 on the breaker 19 to act only when the voltage has exceeded normal thus giving any desired margin.

To prevent a dangerous rise in voltage likely to injure insulation, on the opening of the circuit breaker 19, I may either limit the amount of the opening of the breaker so that only a limited length of arc will be drawn, giving the current flow a chance to continue in the arc as long as the voltage is high or I may place a relatively high resistance 23 in shunt to the breaker for the same purpose. This should be high enough to ance of normal conditions and for re-establishing the original flow of current on the restoration of normal conditions to a predetermined degree.

10. A synchronous type generator, an exciting circuit therefor, an exciter generator connected therein, a second exciter generator also connected therein, normally unexcited and means for abruptly exciting said second exciter generator in response to some predetermined change of condition in the circuit of said synchronous type generator.

11. A synchronous type generator, an exciting circuit therefor, an exciter generator connected therein, a second exciter generator also connected therein, normally unexcited and means for abruptly exciting said second exciter generator in response to some predetermined transient conditions requiring excess flow of wattless current from said synchronrous type machine.

12. A synchronous type generator, an exciting circuit therefor, an exciter generator connected therein, a second exciter generator also connected therein, normally unexcited and means for abruptly exciting said second exciter generator in response to some predetermined transient conditions requiring excess flow of wattless current from said synchronous type machine, together with means for de-energizing said exciting means on the occurrence of said abnormal conditions in excess.

13. A synchronous type electric machine, an exciting circuit therefor, including a direct current generator, a voltage regulator operating on said direct current generator, together with a rotating generator armature, normally unexcited connected in said exciting circuit and means for abruptly exciting said armature on the occurrence of a predetermined departure from normal conditions in said machine.

14. A synchronous type electric machine, an exciting circuit therefor, including a direct current generator, a voltage regulator operating on said direct current generator, together with a rotating generator armature, normally unexcited connected in said exciting circuit and means for temporarily exciting said armature on the occurrence of a predetermined departure from normal conditions in said machine.

15. The combination of a synchronous type electric machine, including a field winding, a field core and an armature winding, an exciting system therefor and means for neutralizing the field demagnetizing effect of an increase in current in said armature and for supporting the current in said armature, said means consisting of means for abruptly producing in said field winding as a result of said increased armature current, an increase in field current having a magnetizing ampere turn value in excess of that of the demagnetizing ampere turns of the increase in armature current.

16. The combination of a synchronous type electric machine, including a field winding, a field core and an armature winding, an exciting system therefor and means for neutralizing the field demagnetizing effect of an increase in said armature current and for causing additional flow of wattless current in said armature said means consisting of means for abruptly producing in said field winding as a result of said increased armature current, an increase in field current having a magnetizing ampere turn value in excess of that of the demagnetizing ampere turns of the increase in armature current.

17. A system of electrical distribution consisting of a synchronous type generator, a field winding, an armature winding and a field core therefor, and a suitable exciting system in combination with means excited by an increase of generator armature current for abruptly introducing voltage into said field circuit in excess of the voltage necessary to support a current therein sufficient to neutralize the field demagnetizing action of the increase in armature current whereby the increased field current acting through the transformer function of the generator armature and field winding will cause a flow of wattless current in the generator armature circuit.

18. The combination of a synchronous type electric machine, including an armature, a field winding circuit including energizing means therefor, and means located in said circuit for momentarily increasing the flow of wattless current in the armature above the value corresponding to the flux existing at the moment.

19. An electric generator including a field magnet and an exciting circuit therefor, including said field magnet in combination with an exciting generator in said exciting circuit, a second exciting generator normally unexcited, also therein, together with means for utilizing the energy stored in said field magnet for quickly establishing the excitation of said second exciting generator.

20. A synchronous type generator, an armature therefor, an external circuit connected thereto having the characteristic of requiring an increase of wattless current to enable it to carry its load under changed conditions, an exciting circuit for said generator, generator field magnets therein and means for abruptly increasing the current in said exciting circuit appropriately for an increase of load and for also sending an impulse of wattless current into said external circuit, said impulse being produced therein shunt the major portion of the field current into the field as rapidly as possible. Ordinarily a resistance requiring several hundred volts to pass full field current might be used, if found necessary. Such a resistance would limit the possible voltage rise and would also cause the flux in the inducer field to rise rapidly.

I may add that it is desirable to make the design of the inducer 14 such as to facilitate quick changes in the magnetic field, for example, by laminating the core, by having a considerable number of poles, by having a large flux and small number of field turns, high speed, etc.

To prevent excessive currents in the winding 4 on short circuits as a result of the devices just described, I may use a latch 25 to prevent the opening of the breaker 19 in case the machine terminal voltage drops below a predetermined value, so that the inducer will not come into play in such a case to increase the armature current.

I claim as my invention—

1. The combination of a synchronous type electric generator, an exciter therefor, a voltage regulator, controlled by said generator and operating upon said exciter to maintain a predetermined voltage, a series wound generator connected in series with said exciter, a shunt for the field of said series wound generator and a circuit opening device in said shunt.

2. The combination of a synchronous type electric generator, an exciter therefor, a voltage regulator, controlled by said generator and operating upon said exciter to maintain a predetermined voltage, a series wound generator connected in series with said exciter, a shunt for the field of said series wound generator and a circuit opening device in said shunt, together with means for opening said circuit opening device in response to a disturbance of normal conditions.

3. The combination of a synchronous type electric generator, an exciter therefor, a voltage regulator, controlled by said generator and operating upon said exciter to maintain a predetermined voltage, a series wound generator connected in series with said exciter, a shunt for the field of said series wound generator and a circuit opening device in said shunt, together with means for opening said circuit opening device in response to a disturbance of normal conditions, and further means for deenergizing said means in case said disturbance exceeds a predetermined amount.

4. The combination of a synchronous type electric generator, an exciter therefor, a voltage regulator, controlled by said generator and operating upon said exciter to maintain a predetermined voltage, a series wound generator connected in series with said exciter, a shunt for the field of said series wound generator and a circuit opening device in said shunt, together with means for opening said circuit opening device in response to a predetermined drop in the terminal potential of said electrical machine and separate means for restraining said circuit opening device when a drop of potential exceeds a second predetermined value.

5. The combination of a synchronous type electric generator, an exciter therefor, a voltage regulator, controlled by said generator and operating upon said exciter to maintain a predetermined voltage, a series wound generator connected in series with said exciter, a shunt for the field of said series wound generator and a circuit opening device in said shunt, together with means for actuating said circuit opening device in response to some predetermined disturbance of normal conditions, and automatic means for restoring said circuit opening device on the restoration of normal conditions.

6. The combination of a synchronous type electric generator, an exciter therefor, a voltage regulator, controlled by said generator and operating upon said exciter to maintain a predetermined voltage, a series wound generator connected in series with said exciter, a shunt for the field of said series wound generator and means for controlling the division of current between said shunt and the series field winding.

7. The combination of a synchronous type electric generator, an exciter therefor, a voltage regulator, controlled by said generator and operating upon said exciter to maintain a predetermined voltage, a series wound generator connected in series with said exciter, a shunt for the field of said series wound generator and a circuit opening device in said shunt, together with a resistance in shunt to said current opening device.

8. The combination of a synchronous type electric generator, an exciter therefor, a voltage regulator, controlled by said generator and operating upon said exciter to maintain a predetermined voltage, a series wound generator connected in series with said exciter, a shunt for the field of said series wound generator and a circuit opening device in said shunt, together with means for controlling excess momentary voltage rise in the circuit resulting from the operation of said circuit breaker.

9. The combination of a synchronous type electric generator, an exciter therefor, a voltage regulator, controlled by said generator and operating upon said exciter to maintain a predetermined voltage, a series wound generator connected in series with said exciter, a shunt for the field of said series wound generator and means for transferring current from said shunt to said series field upon the occurrence of a prescribed disturbthrough the transformer action between the field magnets and armature windings of said generator.

21. A synchronous type electric generator, a field and an armature therefor, an external circuit connected to said armature, and an exciting circuit for said field in combination with means acting in said exciting circuit for producing an impulse of wattless current in said external circuit.

Signed at New York, N. Y., in the county of New York and State of New York, this 25th day of July, A. D. 1924.

PERCY H. THOMAS.